United States Patent
Ledvina et al.

Patent Number: 6,155,943
Date of Patent: Dec. 5, 2000

[54] RANDOMIZED SPROCKET FOR ROLLER CHAIN

[75] Inventors: Timothy J. Ledvina, Groton; John A. Hummel, Ithaca, both of N.Y.

[73] Assignee: BorgWarner Inc., Troy, Mich.

[21] Appl. No.: 09/153,317

[22] Filed: Sep. 15, 1998

Related U.S. Application Data

[60] Provisional application No. 60/060,806, Oct. 3, 1997.

[51] Int. Cl.[7] .............................. F16H 7/06; F16H 55/12
[52] U.S. Cl. ......................... 474/156; 160/152; 160/157
[58] Field of Search .................................. 474/156, 157, 474/152, 160, 212, 231, 155, 148, 162, 140, 164, 161, 901

[56] References Cited

U.S. PATENT DOCUMENTS

| | | | |
|---|---|---|---|
| 2,259,937 | 10/1941 | Klaucke | 474/156 |
| 2,667,792 | 2/1954 | Blendall | 474/156 X |
| 3,752,035 | 8/1973 | Cozzy et al. | 474/156 X |
| 3,880,478 | 4/1975 | Baylor | 474/901 X |
| 4,116,081 | 9/1978 | Luttrell et al. | 474/156 |
| 5,876,295 | 3/1999 | Young | 474/156 |
| 5,921,878 | 7/1999 | Young | 474/160 |
| 5,921,879 | 7/1999 | Young | 474/202 |
| 5,976,045 | 11/1999 | Young | 474/160 |

*Primary Examiner*—Marcus Charles
*Attorney, Agent, or Firm*—Sidley & Austin; Greg Dziegielewski

[57] ABSTRACT

A roller chain and sprocket drive with a randomized sprocket which modulates the roller position on the sprocket by varying the radial seating position of the roller while maintaining a constant chordal dimension between seated rollers. The roots between teeth of the sprocket have radii that vary between a nominal radius and a maximum radius and a minimum radius. This variation or randomization is intended to provide a noise modulation effect while avoiding the negative effects of high impact from conventional randomized sprockets.

6 Claims, 2 Drawing Sheets

RANDOMIZED SPROCKET FOR ROLLER CHAIN

This application claims priority from U.S. Provisional application Ser. No. 60/060,806, filed on Oct. 3, 1997, which is incorporated herein by reference.

BACKGROUND OF THE INVENTION

The present invention relates to a sprocket for roller chain that is designed to modulate the engagement frequency of a conventional roller chain without introducing harsh impact loads on the rollers or bushings. The present invention modulates the roller engagement by randomizing the radial seating position of the roller while maintaining a constant chordal length between the seated rollers. In particular, the root diameters of the sprocket roots (or the portion between the sprocket teeth for seating of the rollers) are randomized around the circumference of the sprocket.

Silent chains have previously used randomized sprockets in an attempt to modulate the engagement frequency of the chain links with the sprocket. The randomization of the sprocket is conventionally achieved by relieving, or removing, a small amount of material from the sides of some of the sprocket teeth. The relieved sprocket teeth are typically interspersed with the non-relieved sprocket teeth in a predetermined pattern around the sprocket. The resulting chain drive produced a modulation of noise from engagement at the pitch frequency. An example of such a chain is shown in U.S. Pat. No. 3,377,875.

As a silent chain contacts such a conventional randomized sprocket, the chordal position of the links varies from sprocket tooth to sprocket tooth. As a result, some links in the chain are subjected to higher impact loads when they engage a non-relieved sprocket tooth that follows a succession of relieved teeth.

A roller chain that utilized such a sprocket with relieved teeth would have some rollers subjected to higher impact loads, which would lead to premature fatigue failure of the rollers. Since roller fatigue is one of the prime failure modes of high speed roller chain drives, this problem presents a major obstacle to the adoption of conventional random sprockets for roller chains.

U.S. Pat. No. 3,448,629 is directed to reduction of chain impact in a roller chain by modifying the bottom diameter of the sprocket root from the theoretically correct bottom diameter relative to a given chain and widening the gap between adjacent teeth of the sprocket sufficiently to allow the modified sprockets to mesh with the chain. This sprocket does not provide a randomization of the root diameters of the sprocket roots around the circumference of the sprocket.

PCT International Publication Number WO 97/11292, published Mar. 27, 1997, discloses a roller chain timing drive directed to reduction of impact noise by thinning the teeth and elongating the root land between each pair of teeth. Through detailed calculation, the root land is elongated resulting in a reduced thickness of the teeth as measured across itself from a drive flank to a coast flank. The result is the maintenance of contact of all rollers wrapped around a sprocket throughout the design life of the chain.

SUMMARY OF THE INVENTION

The present invention is directed to varying the radial seating position of the roller while maintaining a constant chordal dimension between seated rollers. This variation or randomization is intended to provide a noise modulation effect while avoiding the negative effects of high impact from conventional randomized sprockets.

In one embodiment, a roller chain and sprocket drive includes a roller chain having a plurality of pairs of interleaved links. The pairs of links are interconnected by pivot pins. Each of the interconnecting pivot pins contains a generally circular roller member freely rotatable about the pins.

The roller chain is constructed to rotate about a generally circular sprocket having a plurality of teeth spaced about its periphery. The sprocket teeth have roots located between pairs of adjacent teeth for receiving the rollers and allowing the rollers to seat.

Each of the roots is defined by a root radius, which is the distance between the center of the sprocket and the point along the root closest to the sprocket center in the radial direction. At least some of the roots have a first root radius, while at least some of the remaining roots have a second root radius, with the second root radius being less than the first root radius.

The first root radius and the second root radius are determined so that the distance between the centers of adjacent rollers will be generally equal along the rollers seated in the sprocket roots. In other words, the chordal pitch distance, or the distance between the centers of adjacent rollers in the chain, will be the same between pairs of adjacent rollers.

The roller chain and sprocket drive may include a sprocket with a plurality of roots with the first root radius and a plurality of roots with the second root radius. The roots having the first root radius are randomly arranged with the roots having the second root radius in a predetermined pattern about the sprocket periphery. By randomly arranged, it is meant that the pattern is staggered between first and second radii, and not a pure alternating pattern between first and second radii.

The roller chain and sprocket drive may also include a plurality of roots that have a third root radius, with the third root radius being less than the second root radius. Thus, the first, second and third root radii define maximum, nominal and minimum root radii around the sprocket. The roots having the third root radius are then randomly arranged with the roots having the first root radius and the roots having the second root radius in a predetermined pattern about the sprocket periphery. The predetermined pattern is also preferably arranged so that at least one root having the second root radius, or nominal radius, is always between a root having the first radius, or maximum radius, and a root having the third radius, or minimum radius.

DESCRIPTION OF THE INVENTION

Figure 5:
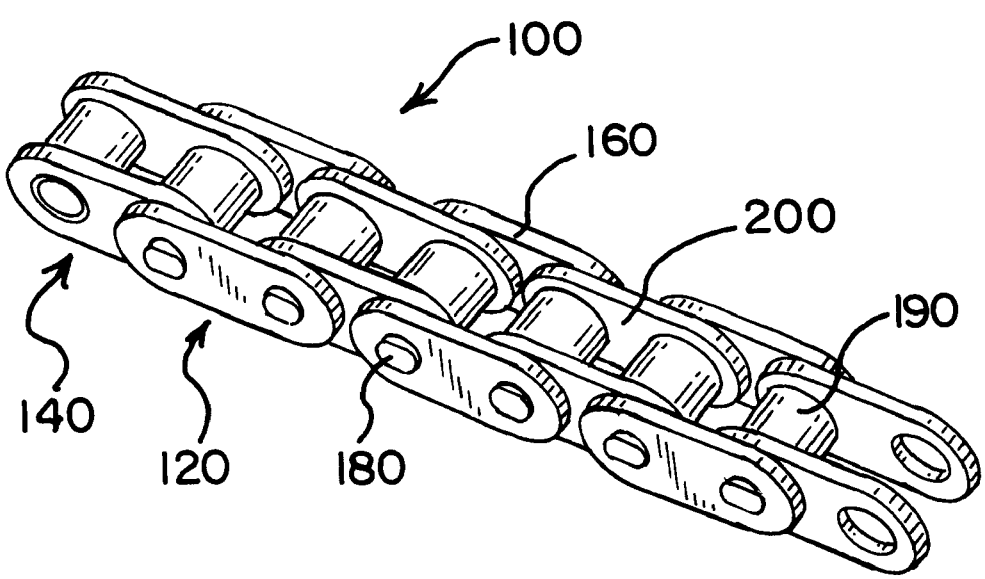
FIG. 5 is a perspective view of a portion of a typical roller chain.

The present invention is directed to a random sprocket for a roller chain in which the radial and circumferential positions of the sprocket teeth are adjusted slightly (or randomized) from their conventional uniform spacing. In this manner, the radial seating positions of the rollers are varied between sprocket teeth while the pitch distance (or chordal distance) between seated rollers remains constant. The roller chain 100 is shown in FIG. 5 and includes a series of interleaved links 120, 140 the links being interconnected by pivot pins 180. Rollers or roller members 190 are located about the pins 180. The interleaved links 120, 140 are formed of pairs of interleaved links, i.e., a pair of outer links 160 interleaved with a pair of inner links 200.

In constructing the random sprocket, an average seating radius is first determined so that the starting and ending positions on the sprocket join smoothly. The adjustment in seating radius is such that the rollers seat in the root between the sprocket teeth at a radial distance of either a nominal seating radius, an upper (maximum) seating radius, or at a lower (minimum) seating radius. Alternatively, the roller seat between the sprocket teeth at a radial distance of either a maximum seating radius or at a minimum seating radius.

The roller seating positions between sprocket teeth are randomly varied around the sprocket in a predetermined pattern. The pattern preferably locates a roller with a nominal seating radius before and after each roller with a maximum or minimum seating radius. When only two seating radii are utilized, the pattern of seating radii is randomized rather than alternated between maximum and minimum.

The variation in roller seating radii results in a modulation of the timing of successive impacts of the rollers with the sprockets. By maintaining a constant pitch distance between the seated rollers, however, the impact loads between the rollers and the sprocket teeth are reduced.

Figure 1:
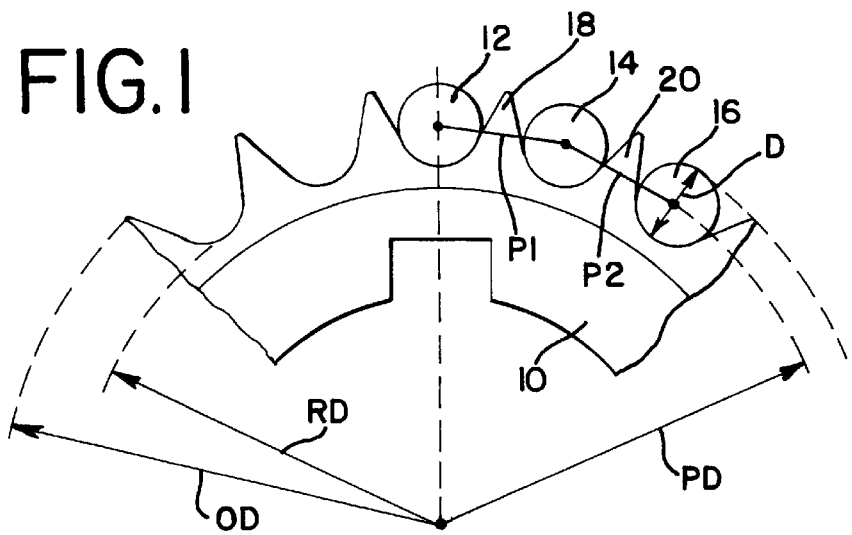
FIG. 1 is a side elevational view of a portion of a roller chain sprocket illustrating the location of the root diameter, pitch diameter and outer diameter.

In FIG. 1, a sprocket 10 is shown with rollers 12, 14, 16 of an associated roller chain seated between two teeth 18, 20. The sprocket is characterized by dimensions of an outer diameter (OD), a root diameter (RD) and a pitch diameter (PD). The outer diameter is the dimension from the sprocket center point to the outermost location on a tooth. The root diameter is the dimension from the sprocket center point to the lowermost location in the root between two adjacent sprocket teeth, the location in the root closest to the sprocket center point shown as point (RP) in FIG. 4. The pitch diameter is the dimension from the sprocket center point to the pitch circle of the sprocket. Each roller also has a diameter of dimension D.

Figure 2:
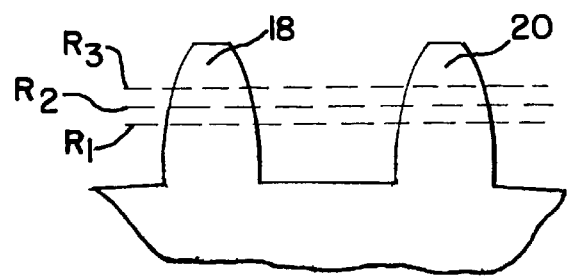
FIG. 2 is a side view of adjacent sprocket teeth illustrating the nominal seating radius, upper seating radius and lower seating radius.
Figure 3:
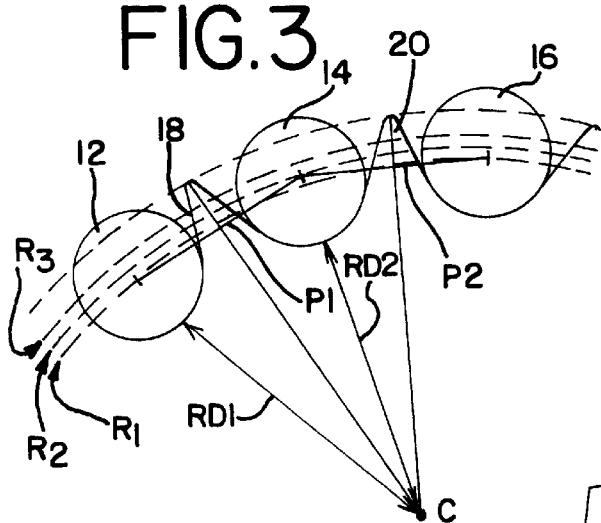
FIG. 3 is a side view of a portion of a sprocket illustrating the seating of the rollers of the associated roller chain; and, FIG. 4 is a side view of a roller and associated sprocket teeth.
Figure 4:
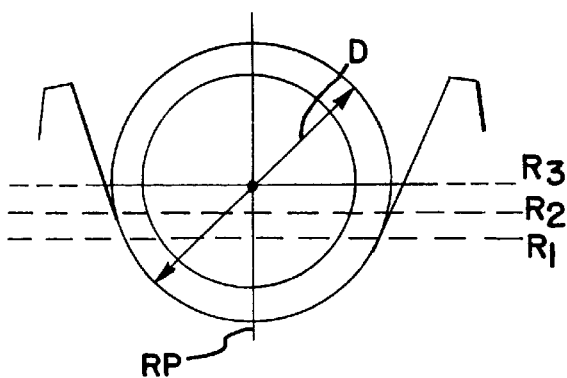

In FIGS. 2, 3 and 4, the arcs that correspond to the maximum seating radius (R3), the minimum seating radius (R1), and nominal seating radius (R2) of the rollers are shown. As shown in FIG. 3, the distance from the sprocket center point (C) to the point (RP) of root radius (R1) is shown as distance (RD1) and the distance from (C) to the point (RP) of root radius (R2) is shown as distance (RD2). As the rollers move from seat to seat between the sprocket teeth, the radial position at which the rollers seat varies from maximum radius to nominal radius to minimum radius. The angular displacement of the sprocket is the angular distance between the center of the roller in one seat and the center of the roller in an adjacent seat. The angular displacement is effectively altered from seat to seat around the sprocket. The present invention is directed to the concept that very small changes in the angular displacement from root to root can have a large effect on the timing of the roller engagement with the seat and therefore a large effect on generation of impact noise. Impact noise includes both a radial component from the roller or bushing striking the bottom of the root as well as a tangential component from the roller or bushing striking the side of the root (or tooth). The present invention is primarily directed to the randomization of that radial component, in contrast to the modification of the tangential component in some prior art sprockets which relieve the side of the tooth.

At the same time, the pitch distance (or chordal length) between seated rollers remains constant. Maintaining a constant chordal length reduces the impact load of the rollers against the teeth. The variation in the seating position from tooth to tooth results in a modulation of the timing of successive impacts. This modulation reduces the pitch frequency noise produced by the chain drive.

The effective tooth thickness as measured at an arbitrary point along the tooth will vary from tooth to tooth around the sprocket as a result of the modification of the root diameters. However, the geometry or shape of the root or pocket which holds the roller in its seated position is maintained generally the same from tooth to tooth. The design of the present invention is directed to maintaining the engagement (or seating) of the roller with the root of the sprocket, but changing the position of the root radially from tooth to tooth. Thus, the modification of the present invention is directed to the root location or position and not to the tooth profile.

A pattern of variation in seating position is chosen as the teeth progress around the sprocket. Preferably, the pattern is random. That is, it varies irregularly around the sprocket. Preferably, the pattern does not contain any abrupt transitions from the upper seating or the lower seating positions to the other extreme position without passing through the nominal seating position for at least one tooth. Avoidance of abrupt transitions should contribute to the smooth running of the chain and reduce the generation of mechanical noise and reduce wear on the rollers.

In order to generate the profile of the sprocket of the present invention, the location of the seating radius of each root (or the space between sprocket teeth in which the rollers seat) must be determined. While locating the seating position of each roller, the pitch distance between seated rollers must remain constant.

A starting value for the mean pitch radius R2 is first chosen. The value of the pitch distance, or the nominal pitch radius $\frac{1}{2} \times P \times 1/\sin(180/N)$, where N is the number of sprocket teeth, is a convenient choice. In other words, a starting value for R2 may be the pitch distance P1 between adjacent seated rollers on the associated chain divided by the quantity $2 \times \sin(180/N)$.

The minimum and maximum pitch radii values are then calculated from the mean pitch radius value. The minimum, or R1, is calculated by subtracting one-half the value of the peak-to-peak pitch radius variation (Delta) from R2. The maximum, or R3, is calculated by adding one-half the value of the peak-to-peak pitch radius variation (Delta) to R2. The first roller center is then located at top dead center of the sprocket at a distance R2 from the sprocket center. The next adjacent roller center is then located so that it is a constant chordal distance P (or the nominal pitch value) from the first roller center and is at a radial distance R1, R2 or R3 from the sprocket center point, depending on the chosen random pattern. The next adjacent roller is then located so that it is a constant chordal distance P from the center of the second roller and is a distance R1, R2 or R3 from the sprocket center point, depending on the chosen random pattern.

In one example of the adoption of the present invention in a standard sprocket for a roller chain for a commercial engine timing drive, the variation between the maximum and minimum was arbitrarily established at 1 mm. The differences in root radius were then set at ½ mm or ¼ mm. Other radii differences may be utilized depending on sprocket size as well as other considerations.

As shown in the drawings, rollers 12 and 14 are separated by pitch distance P1 and rollers 14 and 16 are separated by pitch distance P2. In accordance with the present invention, P1 is the same as P2, and the remaining pitch distances of the seated rollers around the sprocket are also the same distance. As the rollers progress around the sprocket, the rollers are seated at different distances from the center point (C) of the sprocket 10. For example, roller 12 is seated at radius R1, roller 14 is seated at radius R2 and roller 16 is seated at radius R1.

In order to complete the entire sprocket, the chordal pitch distance between the seated first roller and the seated last roller must also equal the nominal pitch, or P. If the chordal pitch distance is not the same as the other seated rollers, then the mean pitch radius R2 must be increased or decreased and the sprocket profile regenerated. Once the seated rollers are appropriately positioned on the profile, the sprocket teeth are positioned so that the radial position of each root or seat is located with the desired clearance between the seat and its mating roller, and such that the tooth space center line is coincident with the radial line from the sprocket center to the mating roller center. The final sprocket profile will likely require the use of blend radii between adjacent teeth.

Thus, a sprocket profile has been provided in which the distances between the centers of the seated rollers (or the pitch distance or chordal distance) remains constant around the sprocket while the location of the seat of each roller varies so that the center of the associated roller is located on an arc of one of three radii distance from the center point of the sprocket.

The present invention has application in bushing chain in which bushings contact the sprocket teeth directly without rollers on the outsides of the bushings. The present invention also has application to silent chains and sprockets in which the impacts of the silent chain links with the sprockets can be modified in the same manner as described above.

What is claimed is:

1. A roller chain and sprocket drive, comprising:

a roller chain having a plurality of pairs of interleaved links, said pairs of links being interconnected by pivot pins, each of said pivot pins containing a roller member freely rotatable about said pins, a sprocket having a plurality of teeth spaced about its periphery, said sprocket including roots located between pairs of adjacent teeth for receiving said rollers, each of said roots having a root radius defined as the distance between the center of said sprocket and the point along said root closest to the sprocket center in the radial direction, at least one of said roots having a first root radius, at least one of said roots having a second root radius, said second root radius being less than said first root radius, said first root radius and said second root radius being defined so that the distance between the centers of adjacent rollers will be substantially equal along said rollers seated in said sprocket roots.

2. The roller chain and sprocket drive of claim 1, wherein a plurality of said roots have said first root radius and a plurality of roots have said second root radius, said roots having said first root radius being randomly arranged with said roots having said second root radius in a predetermined pattern about said sprocket periphery.

3. A roller chain and sprocket drive, comprising:

a roller chain having a plurality of pairs of interleaved links, said pairs of links being interconnected by pivot pins, each of said pivot pins containing a roller member freely rotatable about said pins, a sprocket having a plurality of teeth spaced about its periphery, said sprocket including roots located between pairs of adjacent teeth for receiving said rollers, each of said roots having a root radius defined as the distance between the center of said sprocket and the point along said root closest to the sprocket center in the radial direction, at least one of said roots having a first root radius, at least one of said roots having a second root radius, said second root radius being less than said first root radius, said first root radius and said second root radius being defined so that the distance between the centers of adjacent rollers will be substantially equal along said rollers seated in said sprocket roots, and wherein a plurality of roots have a third root radius, said third root radius being less than said second root radius.

4. The roller chain and sprocket drive of claim 3, wherein said roots having said third root radius being randomly arranged with said roots having said first root radius and said roots having said second root radius in a predetermined pattern about said sprocket periphery.

5. The roller chain and sprocket drive of claim 4, wherein said predetermined pattern is arranged so that at least one root having said second root radius is always between a root having said first radius and a root having said third radius.

6. The roller chain and sprocket drive of claim 4 wherein said pattern includes in part the following sequence of root radii: first radius, second radius, third radius, third radius, second radius, first radius.

* * * * *

UNITED STATES PATENT AND TRADEMARK OFFICE
CERTIFICATE OF CORRECTION

PATENT NO.    : 6,155,943
DATED         : December 5, 2000
INVENTOR(S)   : Timothy J. Ledvina et al.

It is certified that error appears in the above-identified patent and that said Letters Patent is hereby corrected as shown below:

<u>Title page,</u>
Item [56], U.S. PATENT DOCUMENTS, add References:

|            |         |               |          |
|------------|---------|---------------|----------|
| -- 3,377,875 | 4/1968  | Sand          | 474/94   |
| 3,448,629  | 6/1969  | Pfrank        | 474/148  |
| 4,036,071  | 7/1977  | McKnight et al. | 474/156 |
| 4,168,634  | 9/1979  | Griffel       | 474/156  |
| 5,397,278  | 4/1995  | Suzuki et al. | 474/156  |
| 5,848.948  | 12/1998 | Allen         | 474/156 -- |

-- FOREIGN PATENT DOCUMENTS --, and add Reference:

-- 2392290A    12/1978    France --

-- OTHER PRIOR ART --," and add:

-- PCT Publication WO 97/11292 published March 27, 1997, Application Number PCT/US96/14458 --; and -- European Search Report for Application No. EP 98307854.4 dated January 15, 1999 --

Signed and Sealed this

Fifth Day of November, 2002

*Attest:*

*Attesting Officer*

JAMES E. ROGAN
*Director of the United States Patent and Trademark Office*